Patented Sept. 11, 1928.

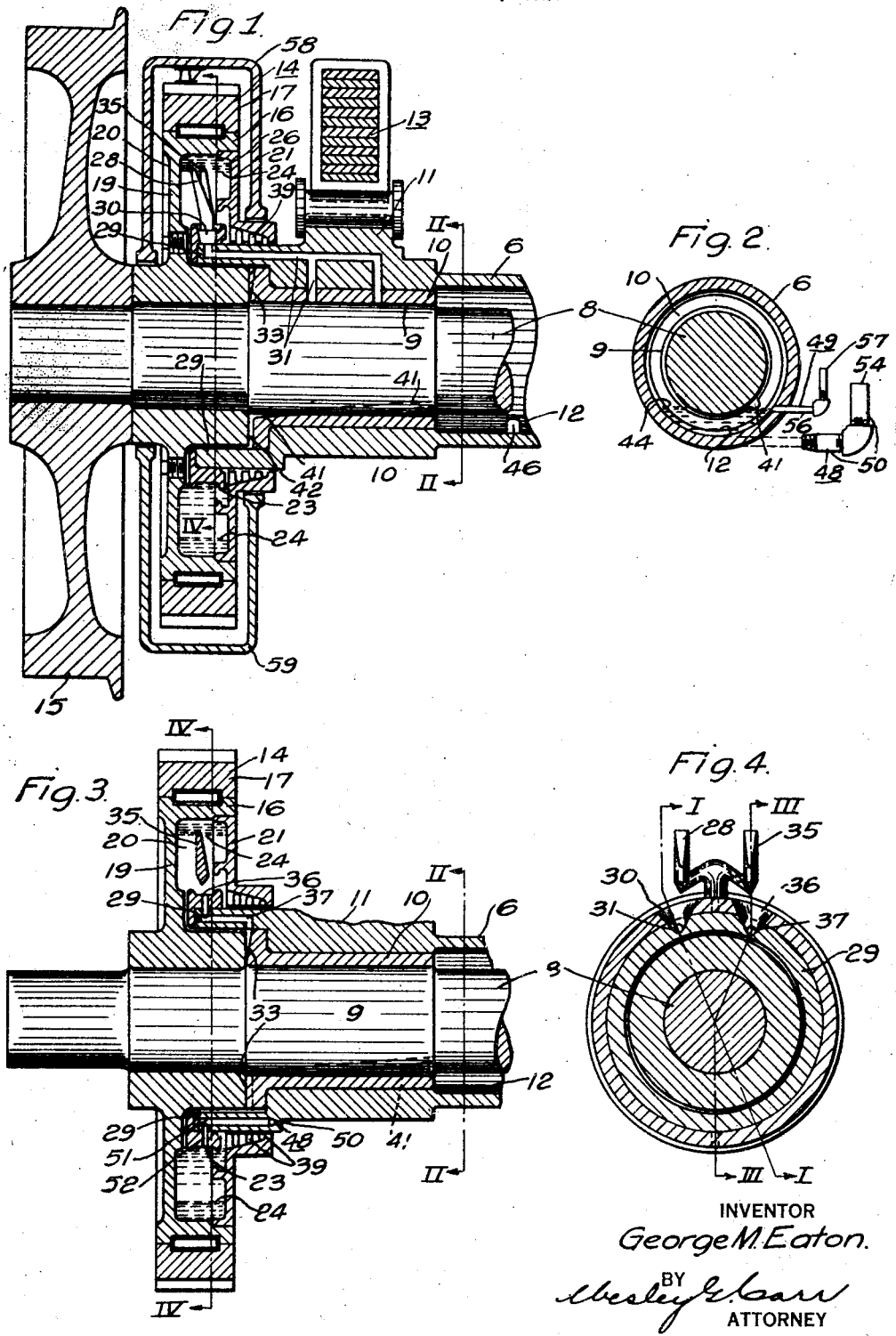

1,684,175

UNITED STATES PATENT OFFICE.

GEORGE M. EATON, OF PITTSBURGH, PENNSYLVANIA, ASSIGNOR TO WESTINGHOUSE ELECTRIC & MANUFACTURING COMPANY, A CORPORATION OF PENNSYLVANIA.

ROTARY OILER.

Application filed February 21, 1927. Serial No 169,711.

My invetnion relates to the lubrication of railway-vehicle-axle bearings and it has particular relation to a system of lubrication for railway trucks having axle-mounted motors and utilizing a novel application of the rotary oiler principle.

The lubrication of railway-motor-axle bearings has always been one of the most difficult problems of railway maintenance because of the difficulty of insuring the additions of the proper amounts of oils at proper intervals and with sufficient care to prevent the introduction of dirt during the filling process.

Heretofore, the railway axle bearings have required lubrication at more or less frequent intervals, and, when the filling operations have been performed with the truck in place underneath the railway car, it has been almost impossible to prevent the falling of dirt from the upper framework into the filling opening.

According to my invention, I provide a novel rearrangement of the parts of a motor truck of the type in question, whereby there is only one place, at each end of the axle, where the lubricating system is in contact with the atmosphere and, consequently, where oil might possibly escape, thereby materially reducing the oil leakage and lengthening the periods between the filling operations.

An important feature of my invention also consists in the utilization of a rotating oil-storing chamber located wholly, or, at least, in part, within the gear wheel through which the tractive effort is transmitted from the motor to the axle.

The foregoing and further advantages will appear from the following description and claims.

Fig. 1 is a vertical longitudinal sectional view showing one end of a railway-axle structure embodying my invention, the section plane being indicated by the line I—I in Fig. 4;

Fig. 2 is a transverse vertical sectional view on the line II—II of Figs. 1 and 3;

Fig. 3 is a view. similar to Fig. 1, but somewhat more fragmentary and taken on a plane indicated by the line III—III in Fig. 4; and Fig. 4 is a transverse vertical sectional view through the rotary oiler, the section plane being indicated by the line IV—IV in Figs. 1 and 3.

My invention has been illustrated in application to an axle-mounted railway motor structure in which the motor frame comprises a stationary quill portion 6 which is integral with the field member of the motor (not further shown) and which surrounds the axle 8 of the railway-motor truck (not further shown). The axle is provided, near each end, with a journal portion 9 which is disposed within a journal bearing or brass 10 carried by a bearing housing 11 which is integral with the quill portion 6, so that the quill portion 6, extending across the truck between the two journal bearing housings, constitutes a leak-proof chamber 12 which positively precludes the possibility of any oil leakage from the axle between the axle bearings thereof. Each bearing housing carries a vehicle-supporting spring-structure 13 which may be of any usual or convenient design.

The driving torque is transmitted from the motor, which is shown on the drawing only by the quill portion 6 of its frame structure, by means of gearing comprising a resilient gear wheel 14 mounted on the shaft between the journal bearing 9 and the adjacent car wheel 15. The resilient gear wheel 14 preferably comprises a gear center 16, which is rigidly carried by the axle, and a spring-connected tooth-ring portion 17, which surrounds the same and is connected thereto by means of springs in a usual or approved manner. The gear center 16 has a non-centrally located web-portion 19 which constitutes one wall of a rotating oil-storing chamber 20 which is located wholly, or at least partially, within the gear wheel. As shown in the drawing, the rotating oil storing chamber is completed by means of an end plate 21 which is welded or otherwise secured to the gear center 16, preferably after the apparatus has been at least partially assembled, as will be subsequently explained.

It will be understood that the oil in the rotary oil-storing chamber will nearly fill the bottom portion of the chamber when the apparatus is at stand-still, as indicated by the standing oil level marked 23, but, when the oil chamber rotates, the oil is thrown out by centrifugal force into a toroidal shape to occupy the extreme peripheral portion of the chamber, as indicated by the rotating oil level 24. The vertical walls of the rotating chamber may also be provided with radial flanges, as indicated by the radial flange 26 on the end plate 21, in order to elevate some of the oil during the very first fraction of a revolution of the apparatus.

Oil is supplied to the journal bearing from the rotating oil chamber 20, by means of an upwardly extending oil-feeding finger 28 which is carried by a cylindrical extension 29 of the bearing housing 11 which projects into the rotating oil chamber near the hub thereof. The oil-feeding finger, dipping into the rotating body of oil, feeds a steady stream of oil to an oil-catching pocket 30 in the cylindrical housing extension 29, whence the oil is conducted, by ducts 31, to the upper portions of the journal bearing 9.

A thrust-bearing surface 33 is provided at the outer end of the journal-bearing member, where the end of the bearing brass 10 butts against the hub of the combined gear wheel 14 and rotating oil container 20. Instead of relying upon the oil escaping from the end of the journal bearing to lubricate the thrust bearing, I have provided an independent and copious supply of oil for this essential thrust-bearing surface, by means of a second oil-catching finger 35, which is slightly spaced from the first-mentioned oil-catching finger 28, and which supplies oil to a second oil-catching pocket 36 in the cylindrical housing extension 29 whence the oil is conducted, by ducts 37, to the thrust bearing 33, as indicated in Fig. 3.

It will be noted that oil can escape from the lubricating system only at one point at each end of the axle, such point being the junction between the inner periphery of the annular end plate 21 of the rotating oil chamber 20, and the adjacent external surface of the cylindrical housing extension 29. The oil leakage at this point is reduced to an absolute minimum by means of oil-catching and wiping members which are indicated schematically at 39.

The utilization of an integral quill member 6, which extends between, and is rigidly connected to, both of the bearing housings at the two ends of the axle, provides an annular space 12, between itself and the axle, which serves as a reservoir which always has oil in it, to assist in the early establishment of an oil film, when starting the apparatus after a long stop. It will be understood that, whereas only one end of the shaft is shown, the other end is precisely like it and hence no additional illustration is necessary therefor.

The oil escaping to the quill reservoir 12 from the inner end of each of the journal members is returned to the rotating oil-storing chamber 20 through the journal brass 10, by means of an oil-return groove 41 which is slightly inclined, so that the returning oil falls downwardly therein, in contact with the bottom of the journal portion 9 of the shaft, to a vertical groove 42 in the end-thrust bearing 33, and thence to the bottom of the cylindrical housing extension 29 which projects into the rotating oil chamber 20.

When the railway vehicle first stops, the oil within the quill portion 6 is at the oil level 44 determined by the end of the inclined return groove 41 in the bearing brass. The oil escapes more or less quickly through the place between the bottom of the journal portion of the shaft and the bottom of the bearing brass, until the oil level in the quill member falls to the bottom of the inner bore of the bearing surface of the brass, but even though the period of stand-still is very much prolonged, the bottom of the journal portion of the shaft will always remain wet with oil, both by reason of the capillary action of the oil in the clearance, and by reason of the fact that the entire lubricating system is closed so that the air therein is saturated, at all times, with oil vapors, and so that there is substantially no evaporation of the oil from the bottom of the shaft portion of the journal.

As a result of the apparatus just described, when the vehicle is started, after a prolonged period of standby, the oily bottom of the shaft is turned upwardly, thereby quickly lubricating the upper bearing portions, before one half of a revolution has been made. This prompt lubrication of the journal-bearing surfaces is very important, as many a bearing has been spoiled by reason of insufficient lubrication during the first few revolutions after a long stop.

Preferably, also, one or more dams 46 should be provided in the bottom of the annular space 12 provided by the quill member 6, for the purpose of limiting the drainage of the oil from the quill member when the car is standing on a banked track.

For filling purposes, I have provided two filling devices 48 and 49, for filling oil to the proper levels, both in the rotating oil chamber 20 and in the annular chamber 12 provided by the quill member 6. The first filling device comprises a pipe 50 which leads from a convenient point in an accessible location, preferably near the outer edge of the truck, to a longitudinally extending duct 51 in the bottom portion of the cylindrical housing extension 29, said duct terminating in a downwardly projecting duct or pipe 52 which terminates at the desired standing oil level 23 in the rotating oil chamber.

Oil is introduced into the rotating chamber by means of an oil gun (not shown) which is applied to the filling opening 54 in the filling pipe 50, by means of which oil is introduced, until more than enough oil has been injected into the oil-storage chamber, the excess oil being then withdrawn by a suction action, produced by reversing the pump, which is continued until the suction breaks when the oil level in the oil chamber 20 falls down to the desired standing level 23.

The second oil-filling device 49, which is connected to the annular oil chamber 12 provided by the quill member 6, comprises suitable pipe 56 having a filling opening 57, whereby oil may be introduced in a similar manner into the quill member 6. The filling openings 54 and 57 are, of course, located above the working oil levels 23 and 44, respectively, in order to obviate the chance of losing oil, even though improper or damaged closing means are provided for these openings.

When the railway vehicle first starts, oil at the bottom of the journal wets the journal surface and lubricates the same, starting to establish an oil film with the first half rotation of the journal, as previously indicated. During the same period, the vertical webs 26 in the oil-storing chamber 20 carry, to the top of the chamber, a certain amount of oil entrained by adhesion, so that, even while the rate or rotation is so slow that centrifugal force is insufficient to throw the oil into the outer portion of the rotating chamber, some of the oil carried up to the top of the chamber will drain downwardly and will be spilled into the two independent oil pockets 30 and 36 on the top of the cylindrical housing extension 29. As the speed increases, the oil in the rotating reservoir is thrown into a toroidal form in the outer periphery of the reservoir, and the oil-catching fingers 28 and 35 deflect a flood of oil to the two oil pockets 30 and 36 previously mentioned, whence the oil flows by gravity to different portions of the bearing surfaces, as already explained.

Oil will escape from both ends of the journal 9. That portion of the oil which escapes from the inner end, enters the reservoir 12 provided by the quill member 6, and overflows into the inclined return groove 41, assisting in lubricating with the thrust collar 33 as it returns to the rotating reservoir 20. That portion of the oil which escapes from the outer end of the journal 9, assist in lubricating the thrust collar 33 and then returns to the rotating reservoir 20. The direct lubrication to the thrust collar, provided by the stream of oil which is supplied by the oil-catching finger 35, is a third safeguard for lubricating this troublesome thrust-bearing element in a positive manner at the very start of the rotation, and this oil also returns to the rotating reservoir.

It will, of course, be understood that proper care and safeguards must be observed during the assembly operations, as the various parts are pressed into place, to secure the proper alinement of the several lubricating ducts and other important parts of the apparatus. As such details are delivered to be obvious to any worker skilled in the art, no detailed explanation of the assembly operation or of the overhaul procedure (in case of removal from the vehicle), is deemed necessary.

One feature of my invention is the isolation of my gear-case lubrication completely from the journal and thrust-bearing lubrication systems. I have departed from the usual custom of mounting the gear case on a stationary part of the structure, by utilizing a two-part gear case 58 and 59, which is loosely mounted, at one end, upon the rotating hub of the gear 14, and which may also be loosely mounted, at the other end, on the rotating oil-sealing portion 39 of the rotary oil chamber 20. The grease or other lubricant disposed in the gear case is thus effectually isolated from the journal-lubricating system, whereby no contamination of the latter is possible by reason of grease escaping from the gear-lubricating system.

I claim as my invention:

1. An axle-mounted-vehicle-motor structure comprising a driving wheel, an axle therefor, an axle bearing, a driving motor mounted on said axle and a rotary oiler for said axle bearing.

2. An axle-mounted-vehicle-motor structure comprising a driving wheel, an axle therefor, an axle bearing, a vehicle-supporting spring mounted on said bearing, a motor non-resiliently supported, in part, by said bearing, gearing between said motor and said axle, said gearing comprising a gear wheel mounted on said axle between said axle bearing and said driving wheel, and a rotary oiler for said axle bearing disposed at least in part within said gear wheel.

3. An axle-mounted-vehicle-motor structure comprising a driving wheel, an axle therefor, an axle bearing, a vehicle-supporting spring mounted on said bearing, a motor non-resiliently supported, in part, by said bearing, gearing between said motor and said axle, said gearing comprising a flexible gear having a gear center mounted on said axle between said axle bearing and said driving wheel, said gear center having a non-centrally located web portion constituting one wall of a rotating oil-storing chamber, and means for lubricating said axle bearing from said rotating oil chamber.

4. An axle-geared-vehicle-motor structure comprising a driven axle carrying a toothed driving gear, a journal bearing for said axle, separate and non-communicating lubricant reservoirs for lubricating the gear teeth and the journal bearing, respectively, and separate and non-communicating lubricating systems associated with the said respective reservoirs for applying lubricant therefrom to the surfaces to be lubricated, respectively.

5. An axle-geared-vehicle-motor structure comprising a driven axle carrying a toothed driving gear; a journal bearing for said axle, separate and non-communicating lubricant reservoirs for lubricating the gear teeth and the journal bearing, respectively, and separate and non-communicating lubricating systems associated with the said respective reservoirs for applying lubricant therefrom to the surfaces to be lubricated, respectively, the lubricant reservoir for said journal bearing being a rotating chamber disposed at least in part within said driving gear.

6. An axle-mounted-railway truck structure comprising a pair of driving wheels, a single axle rigidly connected to both of said wheels, an axle bearing comprising a bearing housing near each end of the axle, a vehicle-supporting spring strutcure mounted on each bearing, a motor comprising a stator frame having an integral quill surrounding said axle and integral with said bearing housings, whereby there is only one possible place where the bearing lubricant might escape to the atmosphere at each bearing, gearing between said motor and said axle, said gearing comprising a gear wheel mounted on said shaft outside of, and adjacent to, one of said axle bearings and a rotary oiler for said axle bearing disposed, at least in part, within said gear wheel.

In testimony whereof, I have hereunto subscribed my name this 9th day of February, 1927.

GEORGE M. EATON.